A. F. AMMAN.
HAY STACKER.
APPLICATION FILED MAY 11, 1915.
1,210,393. Patented Jan. 2, 1917.
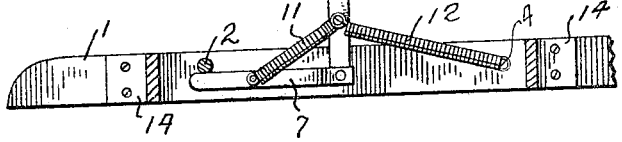
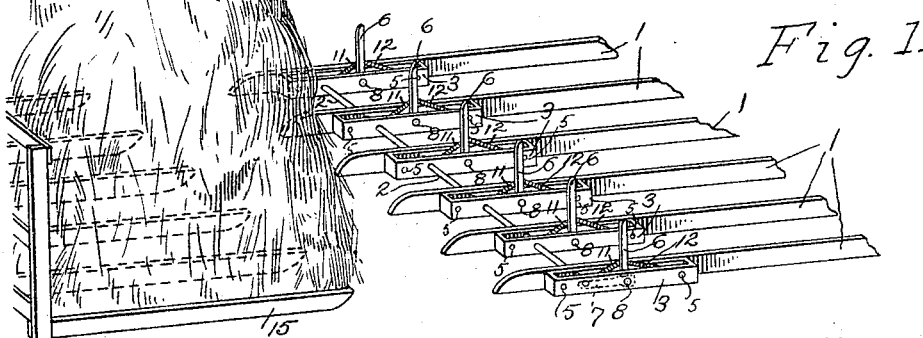
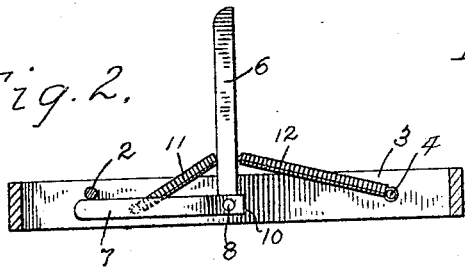
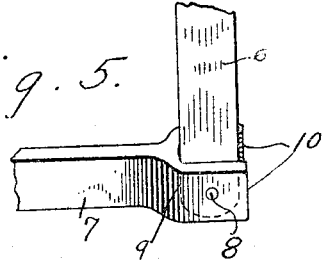
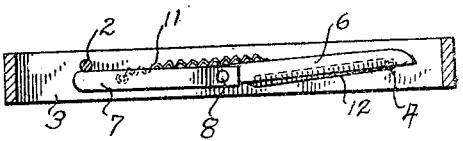
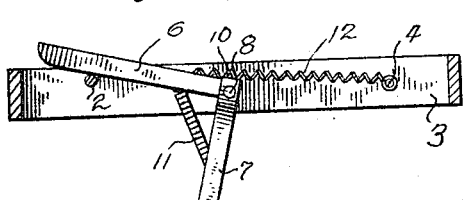

UNITED STATES PATENT OFFICE.

ALBERT F. AMMAN, OF NAPONEE, NEBRASKA.

HAY-STACKER.

1,210,393.

Specification of Letters Patent.

Patented Jan. 2, 1917.

Application filed May 11, 1915. Serial No. 27,415.

*To all whom it may concern:*

Be it known that I, ALBERT F. AMMAN, a citizen of the United States, residing at Naponee, in the county of Franklin and State of Nebraska, have invented certain new and useful Improvements in Hay-Stackers, of which the following is a specification.

This invention relates to the class of hay stackers, and is, particularly, an improvement in hay retaining devices carried by the stacker teeth.

Hay retaining devices, as used in connection with hay stackers have become well known in the art, and consist, generally, of vertically projecting fingers or prongs carried at or near the free ends of the bank of stacker teeth and are resiliently mounted to give inwardly before the impact of a load of hay which is carried onto the stacker by means of a hay-rake or sweep, and to spring again into vertical position after the load has been carried thereover, thereby holding the load in position until the stacker teeth are raised to dump the load upon the stacker.

The object of my invention is to improve the construction of this type of hay retainers, in such a manner that the retaining fingers act to positively remove all of the hay from the rake or sweep and retain all of the hay on the stacker teeth until the latter are elevated to dump the hay onto the stack, and then, when the teeth are elevated, to relieve the fingers of their retaining action, in order to permit a complete removal or dumping of the hay off of the teeth. The resiliently mounted fingers of hay-retainers as heretofore known to me, are so mounted that the spring pressure or tension which tends to hold the fingers upright resists the proper movement of the fingers out of the path taken by the hay when it is dumped from the stacker teeth, so that the fingers serve to retain the hay at periods when they should be functionless.

More particularly, this invention has for its object to provide a set of retaining fingers for stacker teeth which are normally held in vertical position by spring tension, which may break backwardly under the impact of a load of hay, and which can not break forwardly under the action of the load until after the stacker teeth have been elevated substantially into stacking position. Furthermore, the spring tension under which the teeth are held is merely sufficient to hold them vertical, and to restore the parts to normal position after an unloading operation, the locking action against the forward movement of the fingers being positive, and the final removal of the fingers for the dumping of the hay being brought about by the weight of the hay, without substantial resistance being offered by the springs.

With the above objects, and others as will hereinafter appear, in view, my invention will now be fully set forth and described, reference being had to the accompanying drawing, in which—

Figure 1 is a perspective view, showing a series of stacker teeth having my invention applied thereto, Fig. 2 is a vertical sectional view through the casing inclosing the parts of my invention, showing the latter in normal position. Fig. 3 is a similar view showing the position of parts in the position which they occupy when the hay is being transferred from the sweep to the stacker, Fig. 4 is a similar view showing the parts in the position which they occupy when the hay is being dumped from the teeth, and Fig. 5 is an enlarged detail perspective view, showing the relation of the principal elements.

Referring more particularly to said drawings, 1 indicates a plurality of teeth forming part of the lifting device of a hay stacker. A transverse tie rod 2 extends through the forward ends of said teeth 1, and rigidly connects and braces the latter.

Securely mounted at one side of each of the teeth 1, at or near its forward end, is a casing or box 3, said casings or boxes 3 being secured to the teeth by means of bolts or rivets 4 and 5. Mounted in each of the casings or boxes 3 is a pair of fingers 6 and 7, said fingers being yoked together, as hereinafter described and being pivoted upon a common transverse stud 8 carried in the sides of the casing 3, at an intermediate or middle point. As indicated in Fig. 5, the finger 7 is provided at its pivoted end with a fork or yoke 9 whose sides 10 embrace the lower or pivoted end of the finger 6, the fingers 6 and 7 being relatively movable, and the relation being such that when the parts stand in the position of Fig. 2, the finger 6 is free to move or swing rearwardly out of its vertical position, but is prevented from forward movement by its abutment against the base of the yoke 9. The finger 7 is mounted in the casing 3 so that when it lies in normal position, in substantial alinement with the longitudinal axis of the casing, its forward end rests below and in contact with the transverse connecting rod 2, the latter acting as a stop to the upward movement of the finger 7. A spring 11 connects the fingers 6 and 7 so as to hold them in the normally right-angular position shown in Fig. 2. A second spring 12 is connected by one end to the opposite side of the finger 6 and has its other end fixed to the casing 3, as upon the transverse bolt or rivet 4. The strength of the springs is such that, under normal conditions, they hold the parts 6 and 7 in the position shown in Fig. 2, and tend to restore said parts to the position indicated in Fig. 2 after an operation of the stacker. However, the springs are not of such strength as to offer a substantial resistance to the weight or impact of the load of hay and the arrangement is such that during the period that the hay should be kept upon the stacker teeth, the fingers 6 are positively locked in their vertical position, but as soon as the stacker is elevated to unload the hay from the teeth, the positive locking is removed, and the hay is free to swing the retaining fingers 6 forwardly without substantial resistance from the springs 12.

In the operation of the stacker, the teeth 1 rest upon the ground in position to be fed by the sweep or rake 15, the teeth of the sweep riding between the teeth of the stacker, and over the tie rod 2 until the load of hay carried by the sweep has been carried past the fingers 6, the latter having been swung downwardly into substantial alinement with the teeth 1, as indicated in Fig. 3. It is obvious that the action of swinging the fingers 6 rearwardly tensions the springs 11, since the fingers 7 are prevented from following the fingers 6 by the tie rod 2. When the load of hay has passed completely over the fingers 6, the latter are snapped into vertical position again by the springs 11. The teeth 1, carrying the load of hay, are now ready to be elevated and tilted in order to deposit the hay upon the stack. As the teeth 1 are raised clear of the ground, it is obvious that the fingers 7, which had previously been held in substantial contact with the tie rod 2 by the contact of their lower edges with the ground, are now free to swing downwardly, except as they are held in horizontal position by the tension of the springs 11 and 12. However, the weight of the hay which has been backed upon the teeth 1, in its expansion, and in its action of sliding off of the teeth onto the stack bears against the rear edges of the fingers 6 to swing the latter forwardly. Since the fingers 7 are now free to swing downwardly the impact and weight of the hay, as above defined, throws the combination of fingers 6 and 7 forwardly against the tension of the spring 12, as indicated in Fig. 4, the fingers 6 swinging forwardly until they contact upon the tie rod 2, thereby permitting the hay to slide freely thereover onto the stack. As soon as the weight of the hay has been removed from the teeth, and the fingers 6, the latter, together with the fingers 7 will be drawn into the normal position of Fig. 2, by means of the springs 11 and 12.

It is obvious from the foregoing that the function of the springs 11 and 12 is merely to restore and hold the fingers 6 and 7 in their normal position, and that they do not have an appreciable retaining action on the fingers 6 and 7 when the stacker is being operated. When the teeth 1 rest upon the ground, the finger 7 is locked against the tie rod 2, so that the fingers 6 are necessarily locked in vertical position against any forward movement, so that as soon as the fingers 6 are raised to a vertical position, after the passage of a load of hay thereover, the latter are fixedly held in this position until the teeth 1 are elevated from the ground. It is further obvious that the rigid locking of the fingers 6 against forward movement, insures the thorough cleaning of the sweep-teeth of all hay which they may bring to the stacker, and that the positive lock against the forward movement of the fingers 6 is automatically removed with the elevation of the teeth 1 from the ground, and that as soon as the load of hay has been dumped, the restoration of the fingers 6 and 7 is also automatically accomplished.

Figs. 6 and 7 disclose a modified form of the invention. A housing 13, consisting of a shaped metallic plate, has its ends bent into the ears 14, which are secured to the tooth 1, so as to provide a space between the latter and the plate. Suitably mounted in the housing 13 is a stud 16, which may also enter the tooth 1, said stud 16 supporting the fingers 6 and 7 in the manner hereinbefore described. The action of the fingers 6 and 7 in the housing 13 is identical with the action set forth for the first described form.

What I claim, and desire to secure by Letters Patent of the United States is:

1. A hay retainer, comprising in combination with a stacker tooth, a housing, a retaining finger pivoted in said housing, means to hold said finger in normal vertical position and means to lock said finger against forward movement, said locking means being released when said tooth is raised to stacking position to permit the finger to swing forwardly.

2. A hay retainer, comprising in combination with a stacker tooth, a housing, a finger pivoted in said housing, means for holding said finger in normal vertical position, and means for locking said finger against forward movement, said locking means being released when the stacker tooth is elevated into stacking position to allow the finger to swing forwardly under the weight of the load.

3. A hay retainer, comprising in combination with a stacker tooth, a retainer finger, means for pivotally holding said finger in vertical position, with relation to said tooth, and means for positively locking said finger against forward movement, said locking means being released to allow said finger to swing forwardly when the tooth is raised to stacking position.

4. A hay retainer, comprising in combination with a stacker tooth, a retainer finger, means for pivotally holding said finger in vertical position, with relation to said tooth, and a locking-lever carried by said tooth and coupled with said finger to prevent forward movement of the latter until the tooth is raised to stacking position, said locking lever being released to permit the finger to swing forwardly when the tooth is raised to stacking position.

5. A hay retainer, comprising in combination with a stacker tooth, a retainer finger, means for pivotally holding said finger in vertical position, with relation to said tooth, and a locking-lever coupled to said finger and held in locking position when the tooth rests on the ground, said locking lever interlocking with said finger to permit the latter to swing forwardly when the tooth is elevated above the ground.

6. A hay retainer, comprising in combination with a stacker tooth, a retainer finger, means for pivotally holding said finger in vertical position with relation to said tooth, and a locking lever carried by said tooth, said locking lever carrying a yoke which incloses said finger to lock the latter against forward movement when the tooth rests upon the ground, and said locking lever being released to permit forward movement of the finger when the tooth is elevated above the ground.

In testimony whereof I affix my signature in presence of two witnesses.

ALBERT F. AMMAN.

Witnesses:
N. F. HESTER,
JOHN D. KAWLLTE.

Copies of this patent may be obtained for five cents each, by addressing the "Commissioner of Patents, Washington, D. C."